Nov. 14, 1933.   J. E. B. MAILLARD   1,934,809
DISTRIBUTING BOX FOR PASTY AND POWDERY PRODUCTS
Filed May 2, 1931   3 Sheets-Sheet 1
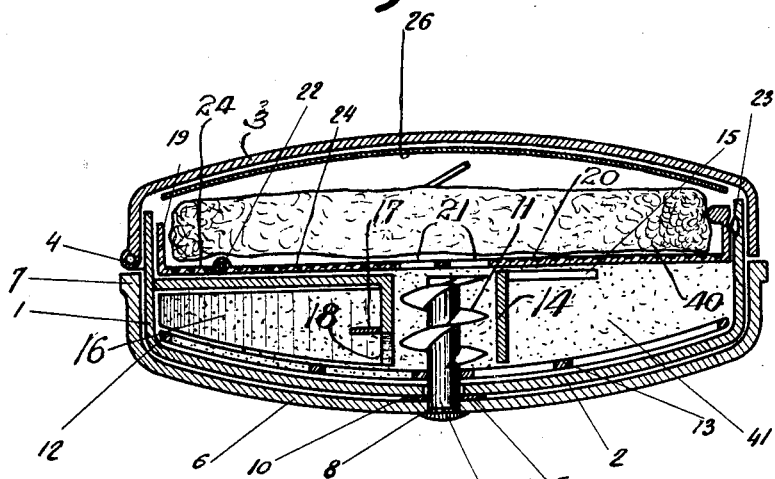
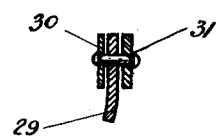
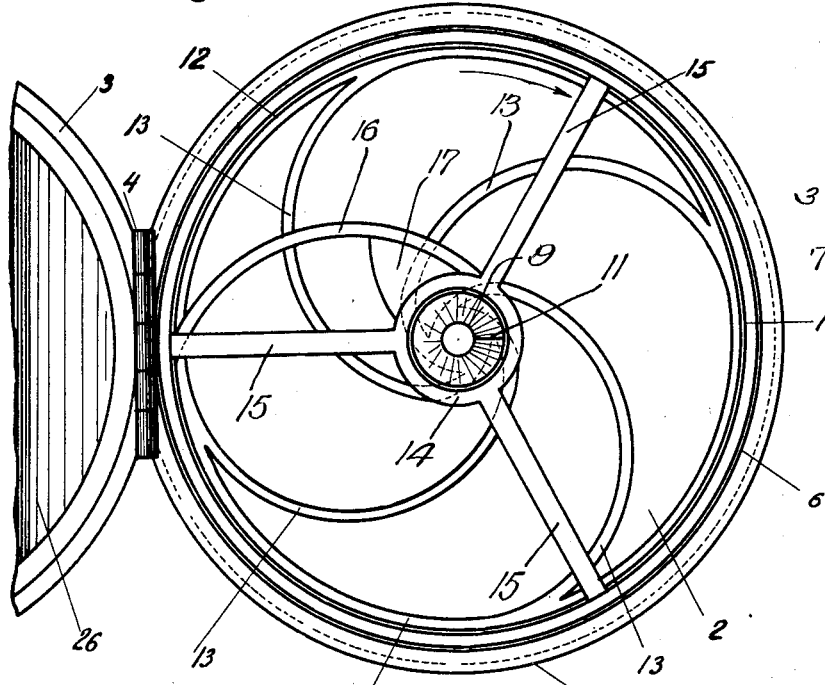
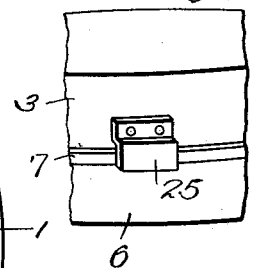
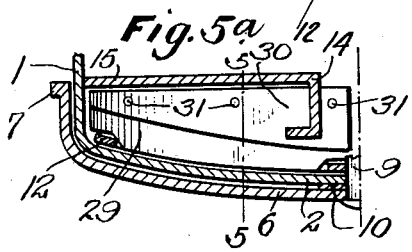
J. E. B. Maillard
INVENTOR
By C. A. Snow & Co.
ATTORNEYS.

Nov. 14, 1933.  J. E. B. MAILLARD  1,934,809
DISTRIBUTING BOX FOR PASTY AND POWDERY PRODUCTS
Filed May 2, 1931   3 Sheets-Sheet 2
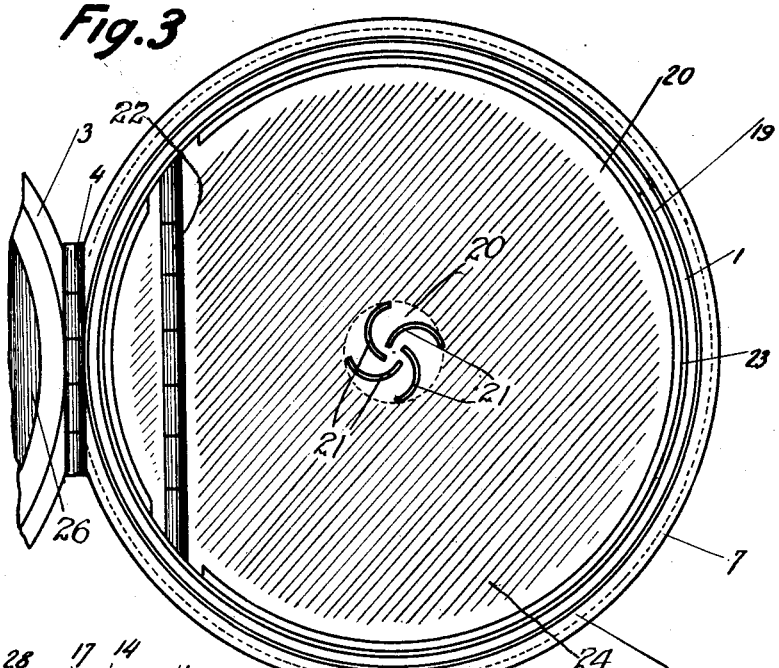
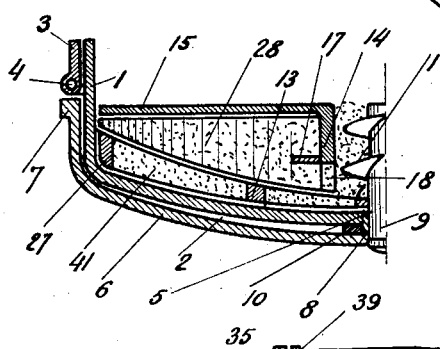
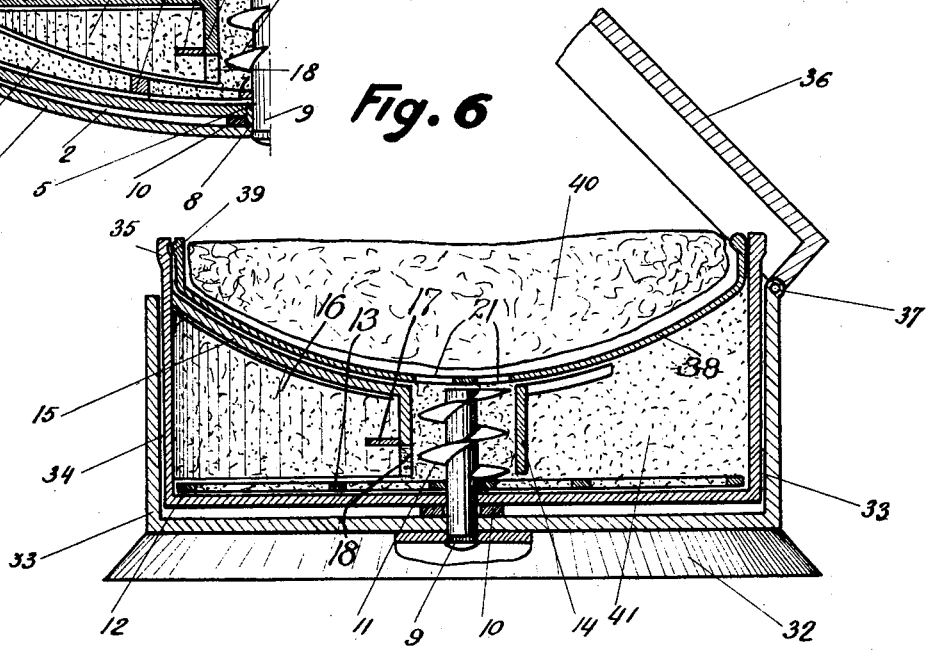

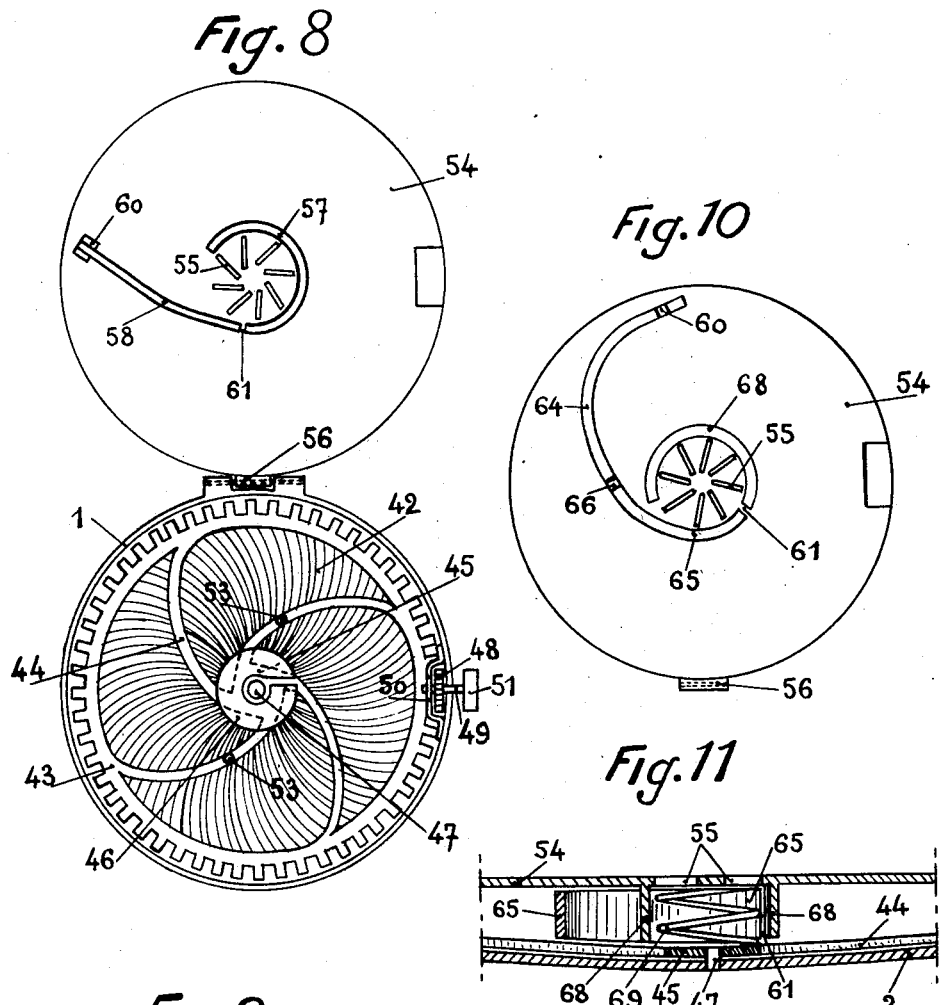

Patented Nov. 14, 1933

1,934,809

UNITED STATES PATENT OFFICE 1,934,809

DISTRIBUTING BOX FOR PASTY AND POWDERY PRODUCTS

Joseph Eugène Baptiste Maillard, Nogent-le-Roi, France

Application May 2, 1931, Serial No. 534,679, and in France May 12, 1930

10 Claims. (Cl. 132—83)

My invention has for its object a distributing box for powdery and pasty products of any kind, such as powder, cosmetics, powdery or pasty soaps, beauty creams and so on.

Preferred embodiments of my invention will be hereinafter described with reference to the appended drawings, given merely by way of example, and in which:

Fig. 1 is a vertical sectional view of a distributing box provided with an elevating screw actuated by a movable false bottom;

Fig. 1a is a partial perspective view of the box showing a detail;

Fig. 2 is a top plan-view of the powder receptacle, the obturating plate that serves to support the powder puff being omitted;

Fig. 3 is a top plan view of the obturating plate of the powder receptacle;

Fg. 4 is a partial vertical section of a box whose bottom wheel comprises arms of special shape;

Fig. 5 is a partial vertical section on the line 5—5 of Fig. 5a of a curved arm provided with a flexible scraper;

Fig. 5a is a corresponding partial vertical section of the box;

Fig. 6 is a vertical section of a stationary box mounted on a stand;

Fig. 7 is a vertical section of another embodiment of the box shown in the closed position;

Fig. 8 is a plan view of the same box with the obturating plate of the powder receptacle in the open position;

Fig. 9 is a plan view of the end of the spring;

Fig. 10 is a plan view of the under side of a modified form of the obturating plate;

Fig. 11 is a vertical sectional view.

The powder box shown in Fig. 1 comprises the main box 1 with its bottom 2, lid 3 articulated about hinge 4 to box 1 and a movable false bottom 6 provided with a flange 7.

A spindle 9, provided at its upper part with an elevating screw 11, passes freely through aperture 5 provided in bottom 2 and is riveted in a hole 8 provided in false bottom 6. A ring 10, made of felt, rubber or any other suitable material, acts as a packing. A wheel 12 provided with curved arms 13 rests on the bottom of box 1 and is secured to spindle 9, so that by rotating false bottom 6, spindle 9 together with its screw 11, and wheel 12 are also rotated. Screw 11 is surrounded by a casing 14, supported in position by rods 15, the other ends of which are secured to the inner wall of box 1. A fixed curved arm 16 extends from the inner wall of box 1 to casing 14 to which it is secured next to an opening 18 provided at the lower part of casing 14 under a horizontal plate 17. Said opening 18 allows powder 41 to reach screw 11 which conveys it to the under side of powder puff 40 through curvilinear slots 21 provided in the obturating plate 20. Said plate 20 is pivoted about a hinge 22 and is locked in position with respect to main box 1 by a spring 23 carried by said box which engages a corresponding recess of rim 19 of plate 20. A small plate 25 (Fig. 1a), fixed to one side of lid 3, is adapted to press against flange 7 of movable false bottom 6 when the lid is in the closed position, so as to prevent false bottom 6 from rotating accidentally. A looking glass 26 is secured on the inner face of lid 3.

In order to cause powder to flow out of the receptacle, it suffices, the box being open, to rotate false bottom 6 by grasping it by flange 7. Spindle 9 drives screw 11 and wheel 12 the curved arms 13 of which draw along powder 41, which upon its reaching stationary curved arm 16 is conveyed toward the centre under horizontal plate 17 and through opening 18. That powder is then caught in the thread of screw 11 and conveyed to the upper face of obturating plate 20 through slots 21. Ridges 24 (Fig. 3) prevent powder from sliding on the surface of the plate and facilitate its distribution on the powder puff.

Instead of a single stationary arm such as 16 and a single opening 18 at the lower part of casing 14, I might provide several arms on the periphery and several corresponding openings, so as to increase the feed of powder.

The embodiment of Fig. 4 is different from the above described one in that the curved arms of wheel 27 have a different shape. These arms 13 have a greater height at the periphery of the box said height gradually decreasing toward the center. Stationary arm 28 of course has a corresponding shape, being of greater height in its central part.

In the embodiment shown in Figs. 5 and 5a, in order to avoid that powder may remain between the arms 13 of wheel 27, a strip 29, made of rubber or any other flexible material, is secured to arm 28, by means of a plate 30 and rivets 31. Owing to its elasticity, said strip 29 is adapted to pass over arms 13 and immediately afterwards to be applied against the bottom 2 of box 1, so as to cause powder to move toward screw 11, without allowing it to remain between said arms.

The large size box of Fig. 6 comprises a stand 32 integral with the outer box 33 which carries lid 36 and hinge 37. Box 34, which is provided with its flange 35, is adapted to rotate in outer box 33, and it draws along in its motion the casing 14 of screw 11, the relatively stationary curved blade 16, rods 15 and the cup-shaped obturating member 38 provided with its rim 39, the powder puff 40 resting in said cup-shaped member.

The operation of that box is as follows: Lid 36, which is hinged to outer box 33, is first opened; box 34 is then rotated by grasping it by its flange 35. Powder 41 is directed by arm 16 toward the opening 18 provided in the casing 14 of screw 11 by which it is elevated and caused to flow out through slots 21 of cup-shaped element 38.

In Figs. 7 to 11 I have shown improvements in the means for feeding powder to the elevating screw and in the means for driving the arms.

The box shown in Figs. 7 and 8 comprises part 1 with its bottom 2 provided with ridges 42 (Fig. 8). A toothed wheel 43 having curved arms 44 is provided with a hub 45 carrying the vertical elevating screw 46. Said wheel is pivotally mounted about axis 47 the lower end of which is riveted to bottom 2 or secured to the latter in any other suitable manner. Axis 47 freely passes through the central part of hub 45 so as to allow wheel 43 to freely rotate.

Toothed wheel 43, provided with its curved arms 44, is driven through a pinion 48, the spindle 49 of which is supported at one end in bearing 50. The whole mechanism is operated by a knob 51 keyed on said spindle 49.

The obturating plate 54 of the powder receptacle (Fig. 8), which is articulated to box 1 by means of a hinge 56, is provided at its central part with a plurality of rectilinear slots 55 which diverge from the centre toward the periphery so as to ensure a proper distribution of the matter on the upper surface of obturating plate 54. Said plate has, rigidly fixed to its under face, a casing 57 which partially surrounds vertical screw 46 when plate 54 is in the closed position shown in Fig. 7. A curved spring 58 is secured at 60 to the under face of said plate 54 and extends downwardly to the immediate vicinity of toothed wheel 43. In its normal position, the free end of said spring 58 is located opposite the corresponding end of casing 57 so that the spring then prolongs the casing. A small tongue 59 is provided at the lower part of said spring 58 close to the free end thereof.

Arms 44 are provided with bosses 53 (Fig. 8) which are adapted to coact with said tongue 59, during the rotation of said arms, so as to cause spring 58 to yield back.

The box is closed by a lid 62 carrying a looking glass 63.

The operation of that device is as follows: When knob 51 is rotated in the suitable direction, the arms 44 of the toothed wheel 43 push the matter to be distributed toward screw 46. The ridges 42 that are provided on the bottom 2 of the box, owing to their disposition in a direction opposed to that of curved arms 44, serve to prevent the powdery matter from sliding on the bottom of the box, and quickly convey said matter toward the elevating screw 46.

During the rotation of toothed wheel 43, the bosses 53 that are provided on arms 44 come into contact with tongue 59 of spring 58. Said spring is thus caught and deflected but, owing to its elasticity, it swings back to its original position in line with the wall of casing 57 as soon as tongue 59 has escaped from boss 53. During that movement it presses the powder against screw 46 and prevents its agglomerating into a mass. Screw 46 then elevates said powder which comes out through rectilinear divergent slots 55 provided in obturating plate 54.

Fig. 10 shows a modified form of plate 54 in which the arrangement of the spring and of the casing that surrounds the elevating screw is slightly different. Blade 64 is fixed at two points 60 and 66 so that its end 65 which is normally in line with casing 68 at 61 acts as a spring. Said casing nearly completely surrounds elevating screw 69 so as to prevent powder from flowing from that screw to the inner part of the box, which would result in the casing becoming emptied.

The tongue 59 of the spring 64 is caught by bosses 53 in the course of the rotation of wheel 43, thus allowing a greater quantity of powder to pass. Said powder is applied against elevating screw 69 when said tongue 59 is released and the end 65 of the spring swings back to its original position in line with the wall of casing 68. The motion of that end 65 of the spring, upon its being released, prevents, as it has already been explained, agglomeration of the powder. The outflow of said powder through diverging rectilinear slots 55 is accelerated with that arrangement. Screw 69 will preferably be so chosen that its threads be close to each other so as to convey powder in a more compact state.

While I have disclosed what I deem to be preferred embodiments I do not wish to be limited thereto as there might be changes made in the arrangement, disposition and form of the parts without departing from the principle of my invention as comprehended within the scope of the appended claims.

What I claim is:

1. A distributing box of the type described which comprises in combination, a receptacle for the matter to be distributed, an elevating screw in the central part of said receptacle, a casing surrounding said screw provided with an opening at its lower part, a wheel having curved arms pivotally mounted below said screw and in coaxial relation therewith, means for operating said wheel and said screw, a stationary arm curved in an opposite direction to that of said first named arms extending between the wall of said receptacle and said casing and located above said arms.

2. A distributing box of the type described comprising in combination, a receptacle for the matter to be distributed, an elevating screw in the central part of said receptacle, a casing surrounding said screw opened at its upper end and provided with an opening in the lower part of its wall, a wheel having curved arms rigidly secured to the lower end of said screw in coaxial relation therewith, means for rotating said screw, a stationary arm curved in an opposite direction to that of the first named arms extending between the wall of said receptacle and said casing and located above said arms.

3. A distributing box of the type described comprising in combination, a cylindrical box forming a receptacle for the matter to be distributed, an elevating screw extending throughout the central part of the bottom of said box and adapted to rotate freely therein, a tubular casing surrounding said screw provided with an opening in the lower part of its wall, a plurality of radial rods rigidly connecting said casing to said box, a wheel having curved arms disposed adjacent the bottom of said box and rigidly secured to the stem of said screw, an outer box surrounding said first mentioned box and having the stem of said screw rigidly secured to the central part of its bottom, a stationary arm curved in an opposite direction to that of the first named arms extending between the wall of said box and the first mentioned casing and located above said arms.

4. A distributing box of the type described according to claim 3 further comprising a small horizontal plate secured to said casing above the opening provided in the lower part of the wall thereof.

5. A distributing box of the type described according to claim 3 further comprising a strip of elastic material rigidly secured to said second mentioned arm and extending down to the bottom of said box.

6. A distributing box of the type described according to claim 3 further comprising an obturating plate hingedly connected to the top of said inner box so as to cover it, and a lid hingedly connected to the same box.

7. A distributing box of the type described according to claim 3 further comprising an obturating plate hingedly connected to the top of said inner box so as to cover it, a lid hingedly connected to the outer part of said inner box, and a small plate carried by said lid and adapted to be strongly applied against the side of said outer box when the lid is in the closed position, so as to prevent accidental rotation of said outer box.

8. A distributing box of the type described comprising in combination, a receptacle for the matter to be distributed, provided with a plurality of curved ridges on its bottom, an obturating plate on said receptacle, a casing axially secured to the under side of said plate, a toothed wheel having curved arms pivotally mounted at the lower part of said receptacle, an elevating screw coaxially secured to said wheel, a pinion for operating said toothed wheel, a spring arm curved in an opposite direction to that of the first mentioned arms carried by the under face of said obturating plate extending between the wall of said receptacle and said casing and located above said arms, a plurality of bosses, one on each arm of the toothed wheel, and a tongue on said spring arm adapted to cooperate with said bosses.

9. A distributing box of the type described according to claim 8 in which the spring arm is fixed at one end to the under face of said obturating plate in the vicinity of the periphery thereof, and has its other end in line with said casing.

10. A distributing box of the type described according to claim 8 in which the spring arm is fixed to the under face of said obturating plate both at one end and at an intermediate point of its length, the other end of said spring arm being in line with said casing.

JOSEPH EUGÈNE BAPTISTE MAILLARD.